(12) United States Patent
Publicover et al.

(10) Patent No.: US 10,963,816 B1
(45) Date of Patent: *Mar. 30, 2021

(54) SYSTEMS AND METHODS FOR TIME-SHIFTING INTERACTIONS USING A SHARED ARTIFICIAL INTELLIGENCE PERSONALITY

(71) Applicant: KINOO, INC., Mountain View, CA (US)

(72) Inventors: Nelson George Publicover, Bellingham, WA (US); Lewis James Marggraff, Lafayette, CA (US)

(73) Assignee: KINOO, INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/081,806

(22) Filed: Oct. 27, 2020

Related U.S. Application Data

(63) Continuation-in-part of application No. 16/902,168, filed on Jun. 15, 2020, now Pat. No. 10,915,814.

(60) Provisional application No. 63/043,060, filed on Jun. 23, 2020.

(51) Int. Cl.
    *G06N 20/00* (2019.01)
(52) U.S. Cl.
    CPC .................... *G06N 20/00* (2019.01)
(58) Field of Classification Search
    CPC .................................................... G06N 20/00

USPC .......................................................... 706/12
See application file for complete search history.

(56) References Cited

U.S. PATENT DOCUMENTS

2016/0042648 A1* 2/2016 Kothuri ................. A63F 13/213
                                                       434/236

* cited by examiner

*Primary Examiner* — Lut Wong
(74) *Attorney, Agent, or Firm* — William A. English; Vista IP Law Group LLP

(57) ABSTRACT

Systems and methods are described for time-shifting interactions by sharing an artificial intelligence personality (AIP). An AIP is an understanding construct that may control a variety of communication experiences to support a sense of ongoing social connectedness. An AIP may be instantiated within one or more HIEs that interact with humans in a human, cartoon or pet-like manner. HIEs may include robots, robotic pets, toys, simple-to-use devices, and graphical user interfaces. The AIP may be periodically updated based on human interactions sensed by the HIEs as well as knowledge of historical and ongoing events. The systems may provide users with intuitive machine companions that exhibit an expert knowledge base and a familiar, cumulative personality. HIEs may continue to operate without interruption in the presence of telecommunications delays or interruptions, and/or the absence of one or more human participants; allowing participants to "time-shift" their sense of connectedness.

20 Claims, 8 Drawing Sheets

SYSTEMS AND METHODS FOR TIME-SHIFTING INTERACTIONS USING A SHARED ARTIFICIAL INTELLIGENCE PERSONALITY

RELATED APPLICATION DATA

The present application claims benefit of provisional application Ser. No. 63/043,060, filed Jun. 23, 2020, and is a continuation-in-part of co-pending application Ser. No. 16/902,168, filed Jun. 15, 2020, the entire disclosures of which are expressly incorporated by reference herein

FIELD OF THE INVENTION

The present invention relates generally to systems and methods for substantially sharing an artificial intelligence personality (MP; artificial personality, AP; artificial intelligence agent, (MA); or artificial human companion, AHC) among multiple human interaction entities (HIEs). The systems utilize techniques within the fields of computer programming, machine learning [including artificial intelligence (AI), artificial neural networks (ANNs), convolution neural networks (CNNs), and deep learning], human-machine interfaces (HMIs), telecommunications, and cognitive sciences including psychology, linguistics and learning. The systems may provide two or more users with intuitive machine companions that exhibit an expert knowledge base and a familiar, cumulative personality to motivate emotional and cognitive exchanges.

BACKGROUND

As the world moves toward an increasing reliance on distance communication (i.e., interpersonal communication in which the physical gap between participants is beyond the physiological limits of unaided human perception), there is a progressive need to make such interactions more efficient, effective and socially acceptable. Currently, there is an extensive range of devices and software to facilitate distance communications. These include a wide span of telephonic devices, video conferencing, smart televisions, image exchange tools, texting, chat, instant messaging, paging devices, notification tools, remote classrooms, electronic billboards, and so on.

Among other attributes and capabilities, such tools and applications may be used to "time-shift" the exchange of blocks of information. In other words, the process of a sender generating and/or transmitting a packet of information does not need to be temporally aligned to the process of a recipient acquiring that information. For example, the transcribing and subsequent sending of an email or the recording of a voice mail, or even a simple hand-written letter, allows a recipient to review message content at a time (or at multiple times, if desired) of his or her choosing, effectively "time-shifting" the interaction.

Time-shifting the exchange of emails, texts, images and other media is a particularly valuable strategy when a recipient is not available to receive the information. For example, the recipient may be asleep, not near a telecommunications device, or at a location where telecommunications are not available. Further, a recipient may not be able to receive an exchange due to technical limitations. For example, transmissions may be noisy or interrupted, transmissions of large blocks of information may require excessive time, and/or substantial time may be required to transmit information over significant distances and/or via a large number of relay stations. A recipient may also simply choose not to receive or review, or not be aware of, an exchange at a particular time. For example, a recipient may be occupied responding to other exchanges, choose to response only at certain times (e.g., in the evenings for personal emails), or be busy performing other activities.

The ability to time-shift information also facilitates an ability to cluster and consolidate information such that high-level decision-making may be more efficient and effective. Current theories in the fields of cognitive psychology and neuroscience suggest that so-called "working memory" is central to reasoning, and a strong guide to decision-making and behavior. It is estimated that working memory (sometimes considered in the context of so-called short-term memory) has a capacity of about four to seven "chunks" of information in young adults (less in older adults and children) lasting about 2-15 seconds, where the range in both capacity and timing depends largely on the type of memory (e.g., language, spatial, number) used to measure retention. It is widely accepted that the prefrontal cortex plays a central role in working memory, particularly for cognitive processing (versus, for example, sensory perception).

Given these limiting capacities for human working memory, a valuable strategy for high-level information processing involves sorting and clustering information into categories and presenting such materials together as "chunks". Time-shifting communications (whether from local or distant sources) to shift presentation order (e.g., from chronological or sorted according to the individuals who were the sources of information) into specific categories or topic areas enables such "chunking" or clustering strategies during information review. Time-shifting allows input from multiple sources possibly at multiple locations, and generated at multiple times to be considered together and over a single period of time (i.e., more consistent with the functioning of working memory).

Furthermore, searching for related information, or even maintaining a "feeling" that one is not considering all possible sources of information often breaks one's ability to focus during processes involved with synthesizing new information and/or decision-making. Knowing that topics are being presented in topic clusters (i.e., pre-sorted) avoids needs or perceptions at critical times to search information exchanges to ensure all inputs have been considered regarding a particular topic. Such strategies to categorize and present related materials together may be essential for optimal and efficient executive function, especially when considering complex problems with multiple dimensions.

"Time-shifting", information "chunking", and "time-sharing" (i.e., the ability to interact with two or more distance communication participants and/or perform additional activities while interacting with distance communication participants) may be valuable tools to improve the efficiency of distance communications and control, particularly involving activities requiring high-level decision making, complex information synthesis, and/or upper management. Improvements to devices and processes that facilitate effective interacting, particularly distance communications, have the potential to impact most major aspects of modern life including work, play, services support, education, and maintaining family and social connectedness.

New paradigms are required to improve the efficiency, effectiveness, productivity, socially acceptability, and sense of connectedness during distance communications. Artificial human companions have not yet fully replaced familiar, supportive social interactions among family members, loved ones, friends, counselors, or colleagues. However, when human companions are not available, AIPs instantiated within shared, personal human interaction entities that are familiar and available to a user at any time may make review of the content of interchanges more effective, aid in bridging gaps in time, and/or help to "time-shift" human exchanges.

SUMMARY

In view of the foregoing, systems and methods are provided herein for substantially sharing an artificial intelligence "personality" (AIP), "character" or "companion" instantiated within two or more human interaction entities (HIEs) implementing a variety of real-time and/or non-real time communication experiences to support a sense of continuous or ongoing connectedness. An AIP is an understanding construct that may manage and perform a variety of communication experiences to enhance such feelings of connectedness and understanding.

An AIP may be instantiated within two or more HIEs that interact with humans in a human, cartoon or pet-like manner. HIEs may include robots, robotic pets, toys, simple-to-use devices, digital assistants, graphical user interfaces and avatars. HIEs may be physical (i.e., solid objects), virtual (i.e., displayed on a screen) or both (interacting simultaneously with a human, or transitioning from one form to another over time). HIE functions may be implemented in the form of a single device that comprises the majority of components necessary for processing, sensing and actuating during human interaction exchanges. Alternatively, HIE functions may be distributed among two or more physical devices that collectively comprise the elements necessary for processing, sensing and actuating during human interaction exchanges where distributed devices may be referred to as human interaction accessories (HIAs). HIAs may generally, although not necessarily, utilize portable power sources (e.g., one or more batteries, one or more solar panels) and/or be interconnected using wireless protocols (e.g., Wi-Fi, Bluetooth, etc.).

Systems may provide two or more users with machine companions that include an individualized familiarity with each user (enhancing acceptance and believability), an exhibiting of intuitive interactions, a cumulatively acquired personality, an integrated knowledge base, and behaviors to motivate emotional and cognitive exchanges. The AIP may be periodically updated based on human interactions sensed by all, or a subset of, the HIEs as well as knowledge of historical and ongoing events. HIEs may continue to operate without interruption in the present of telecommunications delays or interruptions, and/or the absence of one or more (e.g., distant) human participants. The system may improve a sense of connectedness, remove feelings of social isolation, improve learning, enhance enjoyment and/or allow "time-shifted" exchanges among users.

In accordance with an exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; instantiating an artificial intelligence personality into the first human interaction entity, comprising installing the artificial intelligence personality with the first processor such that the artificial intelligence personality interacts with the first human via the one or more first interaction output devices; providing, in proximity to a second human, a second human interaction entity comprising a second electronic device that includes a second processor, one or more second interaction output devices operatively coupled to the second processor, and one or more second sensors operatively coupled to the second processor; instantiating the artificial intelligence personality into the second human interaction entity, comprising installing the artificial intelligence personality with the second processor such that the artificial intelligence personality interacts with the second human via the one or more second interaction output devices; acquiring, during an interaction between the first human interaction device and the first human, first interaction data from the one or more first sensors; identifying, by the first processor, from the first interaction data, an action to be performed by the second human interaction entity upon sensing a condition for performing the action; transmitting, from the first processor to the second processor, indicators of the action and the condition; after receiving the indicators, acquiring, during an interaction between the second human interaction device and the second human, second interaction data from the one or more second sensors; and identifying, by the second processor, from the second interaction data, the condition for performing the action.

In accordance with another exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; instantiating an artificial intelligence personality into the first human interaction entity, comprising installing the artificial intelligence personality with the first processor such that the artificial intelligence personality interacts with the first human via the one or more first interaction output devices; providing, in proximity to a second human, a second human interaction entity comprising a second electronic device that includes a second processor, one or more second interaction output devices operatively coupled to the second processor, and one or more second sensors operatively coupled to the second processor; instantiating the artificial intelligence personality into the second human interaction entity, comprising installing the artificial intelligence personality with the second processor such that the artificial intelligence personality interacts with the second human via the one or more second interaction output devices; classifying, during one or more interactions between the first human interaction device and the first human, a first interaction topic; transmitting, from the first processor to the second processor, the one or more interactions classified as being associated with the first interaction topic; and presenting collectively, with the one or more second interaction output devices, the one or more interactions classified as being associated with the first interaction topic.

In accordance with still another exemplary embodiment, a method is provided to share an artificial intelligence personality among multiple human interaction entities to support social connectedness between two humans, comprising: providing, in proximity to a first human, a first human interaction entity comprising a first electronic device that includes a first processor, one or more first interaction output devices operatively coupled to the first processor, and one or more first sensors operatively coupled to the first processor; instantiating an artificial intelligence personality into the first human interaction entity, comprising installing the artificial intelligence personality with the first processor such that the artificial intelligence personality interacts with the first human via the one or more first interaction output devices; providing, in proximity to a second human, a second human interaction entity comprising a second electronic device that includes a second processor, one or more second interaction output devices operatively coupled to the second processor, and one or more second sensors operatively coupled to the second processor; instantiating the artificial intelligence personality into the second human interaction entity, comprising installing the artificial intelligence personality with the second processor such that the artificial intelligence personality interacts with the second human via the one or more second interaction output devices; initiating, by the second human interaction entity using the one or more second interaction output devices, a first interaction directed at the second human; transmitting, using the second electronic device, first interaction indicators to the first processor; presenting, using the one or more first interaction output devices, the first interaction indicators to the first human; sensing, using the one or more first sensors, a reaction by the first human; and transmitting, using the first electronic device, reaction indicators to the second processor.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which.

DETAILED DESCRIPTION OF THE EXEMPLARY EMBODIMENTS

Figure 1A:
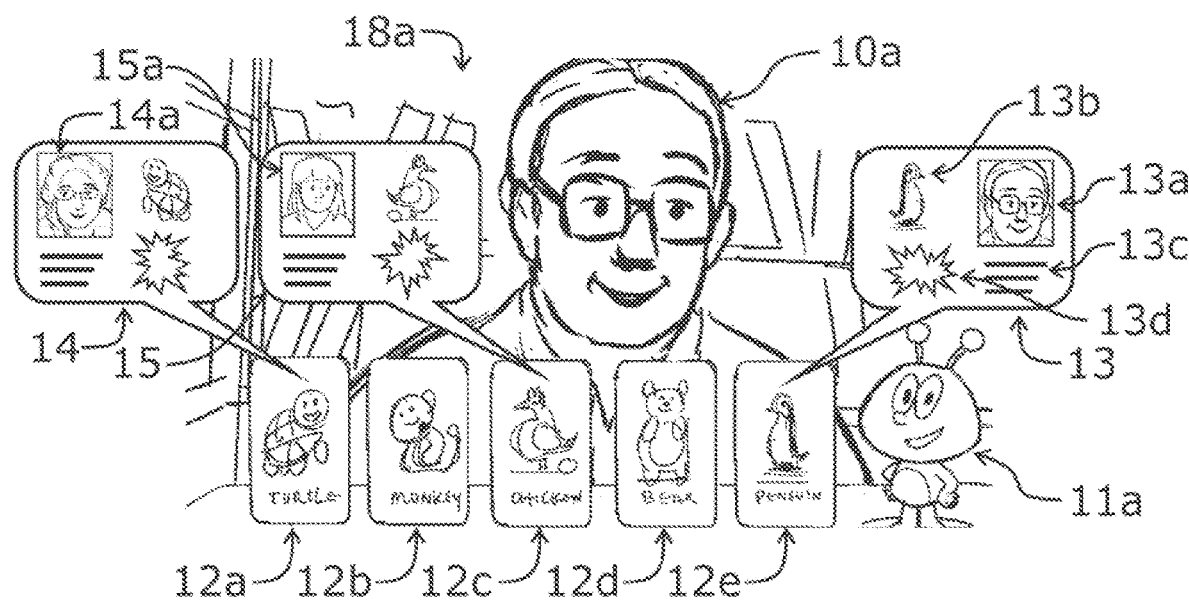
FIG. 1A shows a scene from a scenario in which the parents and friends of a child setup, using a shared artificial intelligence personality, conditional actions consisting of personalized audiovisual clips (from each parent or friend) to be displayed to the child whenever he/she points toward an image of an animal.

In exemplary embodiments, an artificial intelligence personality (AIP) is substantially shared among two or more human interaction entities (HIEs). The system may be implemented using two or more HIEs (including, if desired, associated human interaction accessories, HIAs) and, optionally, one or more remote and/or distributed processors to compute updated AIPs and/or sequence telecommunications. For example, each HIE may include an electronic device, such as a desktop computer, portable computer, tablet, cellphone, and the like, including one or more processors, memory, user interfaces (e.g., including one or more sensors, input devices, and/or output devices), communication interfaces, and/or other hardware components and/or software modules, as described elsewhere herein. In addition, some HIE function may be performed by other devices or systems, e.g., an associated HIA and/or remote servers including one or more processors, memory, and/or other hardware components and/or software modules, as described elsewhere herein. The system may provide two or more users with intuitive machine companions that exhibit an integrated knowledge base and a personality cumulatively acquired from all, or a subset of, interactions, and/or simulated (virtual) interactions with users. Further aspects of the systems and methods to establish and time-share a cumulatively acquired AIP are described in co-pending U.S. patent application Ser. No. 16/902,168, filed Jun. 15, 2020, and U.S. Pat. No. 10,762,414, the entire disclosures of which are expressly incorporated by reference herein.

For the purposes of the present application, an AIP (artificial intelligence personality) is an understanding construct that interacts with one or more humans in a human, cartoon, or pet-like manner. An AIP may include a background or database of: 1) information, 2) memories and/or 3) experiences. At the core of an AIP is an artificial intelligence that may be implemented by combinations of traditional programming, and forms of machine learning including convolution neural networks and/or other deep learning techniques. Neural networks may encompass large components of an artificial intelligence, such as control of actuators (of a HIE or HIA) to express a wide range of behaviors; or be segmented into sub-components where each subsystem performs specific tasks, such as emotion recognition, searching strategies to acquire new information, speech recognition, cursive script recognition, word translation, speech formation, facial feature recognition, gesture recognition, animation display, control of articulated movements, holographic display, and so on.

In exemplary embodiments, AIP knowledge and information may be: 1) embedded within machinery (e.g., software, firmware and/or neural networks), or 2) incorporated via the capability of being able to search for information when needed using telecommunications such as searching the internet and/or the so-called "cloud." Some information may be specifically taught to an AIP, such as the birth dates of all users within a human network as well as, for example, their relatives and acquaintances. Other information may be known and available more globally, accessed via internet search strategies that are known in the art. Searching and selecting information along with the ability to synthesize new information from such multiple sources greatly expands the "intelligence" component of an AIP.

AIP memories include those gathered using device sensors from the environment of one or more users. For example, the overall locations of a HIE (using, for example, GPS methods known in the art, and/or forms of localization using object recognition to identify objects at known relative locations within video images) recorded over time and/or, for example, the time of day that a wake-up alarm frequently rings (detected using a microphone) may become AIP memories. An aspect of a shared AIP is an ability to store selected memories (e.g., as permitted by each user) from the environments of two or more users. Such a common database may allow more meaningful behavioral interactions to be enacted, enabling a shared AIP to more closely link the interactions of its users, even when one or more users are separated by geographic distance and/or availability.

In further embodiments, AIP memories and experiences include those acquired using human interaction sensors as a result of interactions with AIP users. Such interactions are often multi-modal in nature, involving inputs from a number of sensors (audio, visual, tactile, etc.), sensing over a wide range of scales (e.g., camera sensors the detect small movements of the eyes, larger movement of the head, gross gestures observed when viewing the entire body, or recognized objects within landscapes), and over a wide range of time scales (from milliseconds to months). AIPs may be updated, partially or fully, based upon the availability of new information and/or computational resources; and/or other forms of direction provided by other parties such as technicians, psychologists, counselors, teachers, advisors, supervisors, other humans, and/or other AIPs.

As described more fully in U.S. Pat. No. 10,762,414, filed Apr. 19, 2019, the entire disclosure of which is expressly incorporated by reference herein, AIP interactions may be combined with archived data and sensed inputs to perform a substantially continuous assessment of human factors such as attention, learning, performance and health. Such substantially continuous monitoring may be performed in a covert manner (i.e., measurements particularly of the timing and content of human responses during a typical course of AIP interactions) or overtly, for example, by periodically performing performance examinations that may be in the form of games, quizzes and/or physiological or psychological testing. Data acquired by AIPs may also be used within efforts to help mitigate some aspects of degraded human health and/or performance over time, particularly for individuals who are physically or emotionally isolated.

HIEs (human interaction entities) may be 1) physical, 2) virtual, or 3) a combination of physical and virtual, particularly at different times or within different environments (e.g., a physical device when a user is seated and a related virtual avatar displayed on a mobile device when moving about). Physical HIEs (or a collection of interacting and/or coupled human interaction accessories, HIAs) may include robots (moveable or substantially stationary), robotic pets, robotic toys (e.g., dolls, teddy bears, baby-like figures, mechanical constructions), and human-like objects. Virtual HIEs may have features found in avatars, digital assistants, cartoon characters, or synthesized persons or pets that may be displayed on computer monitors, screens, laptops, mobile devices (phones, tablets, smart watches, etc.) or other display devices including augmented reality, mixed reality and virtual reality headwear. Virtual HIEs may also be displayed as holograms, holographic-like projections, light-field projections, and other techniques that make video objects appear 3-dimensional.

In exemplary embodiments, HIEs may include environmental sensors (i.e., sensors measuring one or more elements within the environment of the HIE), and human interaction sensors (i.e., measuring interactions between the HIE/HIA and a user). Environmental sensors may include cameras (i.e., directed toward the environment of a user), light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers. Environmental sensors may also include devices worn by a user (but directed at the environment) such as smart glasses (e.g., Google Glass), augmented reality headwear, earbuds (e.g., with a microphone), smart watches, and so on. Human interaction sensors may include cameras (i.e., directed toward the user), thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, activity monitoring devises, computer mice, joysticks, keyboards, touch screens, and proximity sensors. Both environmental and human interaction cameras may include the ability to pan and zoom.

In cases when a HIE comprises a physical device (or a collection of interacting and/or coupled HIAs), the acceptability of human interactions may be enhanced by movements, gestures, information displays, pointing, sounds, and other forms of HIE/HIA outputs or interaction. Actuators or other output components may include one or more video display devices, hologram display devices, holographic-like projectors, speakers, buzzers, propulsion systems, servos, motors, magnetic field controllers, orientation controllers, haptic controllers, laser light and other forms of pointing devices, switch controllers, actuators for appendage control, and controllable tactile surfaces.

In exemplary embodiments, HIE outputs may change, depending on time and circumstances. For example, a full range of HIE outputs may be utilized in a stationary environment while video-only exchanges are performed in a mobile setting and/or audio-only outputs may be produced, for example, while driving. Generally, more freedom of movement is available using untethered HIEs and/or HIAs (i.e., not connected to any fixed wired power or wired telecommunications source). Tethered HIEs may allow for continuous interaction (with fewer concerns regarding power consumption, battery life, etc.) and/or more sophisticated interaction devices (e.g., holographic displays, projected images, etc.). In further exemplary embodiments, a combination approach may be employed, where wireless telecommunications are used during most interchanges during the daytime and the recharging of batteries and updating of shared AIP data are additionally performed when tethered at night (e.g., while a user is asleep).

Since the shared AIP instantiated within HIEs "knows" (as allowed by each user) most or all activities by human members of a network, HIEs may decide what, how, when, and why to share information, experiences, emotions, or interactions with any member(s) of a group to amplify social interchange. Experiences may reflect and motivate appropriate social interactions to evoke emotions and reinforce bonding or connectedness, and are regular reminders of the social pact that exist between the humans, even when separated by some distance. Such sharing, particularly when separated by long distances, may be a vital part of feeling "connected."

Reactions and behaviors of humans may be shared via curation and/or interpretation by a shared AIP instantiated within HIEs to engage in an educational interchange of information, demonstrations of learning, and/or advancement of thought regarding different topic areas. In addition to interpreting, curating, mediating, and responding to actions, a shared AIP may, at times, recognize needs and initiate actions (including facilitating the establishing of connections) to evoke certain behaviors, to assure engagement and shift emotions. In other words, HIEs instantiated with a shared AIP may play the role of counselor and/or spiritual guide.

In exemplary embodiments, a shared AIP may initiate an exchange with a human based on: 1) learning about an event during an interaction with another human sharing the AIP, 2) an assessment that a "critical mass" of multiple events worthy of being reported has transpired with another human sharing AIP exchanges, 3) an assessment that a "critical mass" of multiple events has transpired cumulatively among multiple humans sharing the AIP, 4) periodically, for example, at the same time each day or week, and/or 5) upon declaration of an important or emergency situation by one or more users, or the shared AIP.

In further embodiments, a HIE (e.g., using a shared AIP instantiated within the HIE) may be used to consolidate time-shifted exchanges with multiple individuals who share interactions with the AIP. For example, a distantly connected parent with more than one child may interact with an AIP during a single session, updating daily events by all children. Such updates may be as a result of single AIP interactions with a child, multiple interactions between the AIP and a child that occurred at different times, or a combination of single and multiple interactions by different children. A single interaction by the distant parent with the AIP monitoring the activities of all children in a single sitting effectively and efficiently "consolidates" (in addition to "time-shifting") shared AIP exchanges involving more than two individuals. Any collective feedback or advice directed and distributed to each child individually, a subset of children, or all children may also be generated by the parent or guardian within such a single AIP interchange session.

In addition to temporally consolidating information based on interactions with multiple individuals, the AIP may sort and/or cluster the reporting of events based on classifications within one or more topic areas. For example, an AIP may organize reporting on sports activities by all children even though activities may have been reported to the AIP at different times and by different children. A subsequent topic may involve clustering or consolidating school activities of each child where child-AIP interactions that where the basis for reporting may have occurred at different times.

In further embodiments, organizing information with an AIP based on topic (versus organization, for example, by chronological order of when information was generated, or the identity of information sources) may save substantial time and effort (i.e., maintain one's train of thought) during an AIP interaction. For example, responding to communications that are sorted by a shared AIP may alleviate the need to search all exchanges for information to examine and/or respond to a particular topic area. As described above, within the Background section, having all sources (or potential sources) of information on a topic simultaneously available greatly increases the ability within so-called "working memory" (with limited retention capacity) to consider and synthesize new information and/or formulate conclusions, particularly regarding complex issues.

Along similar lines, when reviewing and responding to an AIP-curated topic area, a response may be classified as being within a single topic, or touching upon multiple topic areas. The shared AIP may, for example, incorporate multiple topic classifications within an exchange so that the exchange may be brought up by the AIP the first time any of the topic areas arise. Additionally, individual exchanges may be directed at multiple (or a selected subset of) individuals. For example, providing instructional advice by a parent on how to perform an activity associated with a particular hobby may subsequently be brought up by a shared AIP in the context of either an "educational" experience or a "fun" activity (i.e., whichever topic arises first during a child's review). In addition, the parent may direct the instructional advice to those children who are interested in the particular hobby.

In further exemplary embodiments, the primary sorting of multiple time-shifted exchanges according to topic area may additionally use secondary sorting strategies similar to those found in most spreadsheet-based applications. In other words, a primary sort may be based on any data structure or type such as topic area; however, those interactions classified to be within a particular topic (or other initial sorting classification) may subsequently be additionally sorted in chronological order, according to the participant(s) generating the initiating interaction, in accordance with a pre-defined set of interaction content priorities, interaction content sorted alphabetically, interaction content sorted numerically, and so on.

Primary and secondary (and tertiary, etc.) sorting may be based on any classifiable data or data subsets, involve logical relations (e.g., "and", "or", "not") and be generated and/or sorted in any order (e.g., ascending, descending). For example, a grandparent may wish to review all interactions that occurred on a particular day, secondarily sorted by topic area, presented in reverse chronological order, and only from teenaged children.

Such curation and/or organization by topic area and/or any other attribute(s) by the shared AIP may further enhance the efficiency and effectiveness of "time-shifted" exchanges. Examples where AIP consolidation and clustering of topics may lead to increased efficiency include interactions between an employer and a group of employees, a teacher and students, a political leader and members of his/her organization, an instructor and a group of hobbyists, a coach and a sports team, a lead strategist and members of a task force, and so on.

In further embodiments, a shared AIP may be utilized by an initiating user to convey one or more conditional responses, that define "conditional actions" to be performed by one or more target users, contingent on the meeting of one or more criteria (i.e., conditions) established by one or more initiating users. Conditions that trigger responses by the shared AIP may arise based on the state of a target user (e.g., whether perceived as happy or sad, whether the user is in a particular place), conditions in the environment of the user (e.g., music is playing, raining outdoors), and/or combinations of a wide range of overall conditions (time of day, the occurrence of a world event). Conditional responses may setup relatively simple scenarios where an action is triggered upon the meeting of a single condition, or one or more initiating users may employ combinations of conditional responses to establish any number of alternative scenarios (e.g., involving alternative audio or video clips) to be deployed as different conditions arise during AIP interactions by the one or more target users. Conditions may depend on environmental and user states during interactions with the initiating user, the one or more target users, and/or one or more other shared AIP users.

Conditional responses are particularly useful during time-shifted interactions, for example, due to communications delays or a lack of availability of a user who is a target of a conditional response (e.g., a target user is asleep or in transit). Conditional responses may be setup and sent by one or more initiating users to a single target user or broadcast to multiple target members of a group of shared AIP users. The criteria for conditional responses may include logic relationships (e.g., "and", "or", "not") where an associated action may be enacted only if two or more criteria are met (i.e., logic "and"), an action may be enacted if any one of a number of criteria is met (logic "or"), an action may be enacted when a condition ceases to be present (logic "not"), or combinations of such logic operations.

As further examples, one or more conditions may be established that rely on identifying a verbal response, gesture (e.g., pointing, waving, etc.) or facial expression (e.g., determined to be happy, sad, confused, etc.) during any interaction by any shared AIP user. Similarly, conditions may depend on one or more users being at specified locations. Conditions may also depend on the specific contents of words or text generated during an interaction or, more broadly, one or more topics covered during an interaction. Along similar lines, conditions may depend on establishing a contact or connection with another individual, group or organization. An initiating user may even setup conditions for him/herself, effectively generating "reminders" and/or actions that are performed "automatically" (i.e., without further thought).

When a condition (by any user) is met, an acknowledgement that the condition was satisfied, including the time it was satisfied, may be fed back to the initiating shared-AIP user. Further, if the action associated with the condition was performed, or was unable to be performed, an acknowledgement of performance, or indicators of reason(s) for not being perform, may be fed back to the initiating user. This scheme allows for tracking conditional actions that have been setup.

Conditional responses may be used within simple (e.g., so-called "if this, then that") scenarios or within schemes that may involve a large number of potential conditions and/or outcomes. As an example of the latter, consider the ability of a distant parent or grandparent to play a time-shifted game of "hide 'n seek" with a child. Within a virtual scene (e.g., farm setting) a parent may record a large number of audiovisual responses to being discovered (e.g., by looking at or pointing) by the child during the game in any number of different hiding locations. For example, within one audiovisual response, the parent may imitate the sound of a cow while laughing when, during the subsequent playing of the game, the parent is discovered by the child at a location near a cow. Similarly, the parent may make a recording of him/her imitating the clucking sound of chickens to be broadcast when she/he is discovered near a chicken coop.

In additional embodiments, conditional responses may be sourced from more than one initiating user and/or directed at more than one target user. For example, in the time-shifted game of "hide 'n seek" just described, multiple parents and friends may provide additional audiovisual responses to being discovered by the child in different hiding locations. Additionally, parents may anticipate more complex scenarios, for example, when no one is found during "hide 'n seek" for a period of time, one or more hints may be provided as clues to any number of game participants. Parents may setup their conditional reactions (e.g., audiovisual clips) upon finding one or more children (e.g., participating in the same game simultaneously via the shared AIP) hidden or searching in different locations. The use of an array of more complex conditional responses may allow children to repeatedly play "hide 'n seek" in a "time-shifted" fashion with their friends, parents, siblings and/or other members of their extended family without repeating a game sequence or outcome.

Aspects of distant schooling are another example where the use of conditional responses and resultant conditional actions may be effective both educationally and in promoting a sense of connectedness. A distant guardian or parent may record conditional responses directed toward a target child upon receiving various scores on a test. For example, a score of "A" may result in a "Hooray" action; while a "B" may result in "That's good"; a "C" may result in "Let's see what happened"; and a "D" may prompt "Let's see how we can do better". In this case, a so-called "1-of-N" selection can be setup as a series of conditional responses and associated actions where the conditions collectively cover a full range of possible test scores.

Distant schooling may augment traditional schooling or home schooling in personal, age-appropriate and meaningful ways. For example, when a child reaches a certain skill level in mathematics, a parent may setup a scenario in which the distance between the parent and child is determined. If the distance is expressed in miles, then the parent may ask to convert that distance into kilometers. If the child is unable to perform the conversion, then a conditional action may be enacted (e.g., a recorded audiovisual clip) in which the parent provides the factor to convert from miles to kilometers. Using previously encoded conditional responses, a parent may then ask how many seconds it takes for light to travel that distance (assuming a vacuum medium). A guardian or parent may setup any number of conditional responses and associated actions for any number of topics to "time-shift" learning, conversations and interactions.

Additional examples where conditional actions may be used in time-shifted, shared fashion using a shared AIP to perform connected activities include: reading a children's story (e.g., before bedtime), engaging with interactive books, building (together) an actual or virtual machine or toy (e.g., Lego, erector set, etc.), performing an actual or virtual chemistry experiment, instructing how to operate a real or virtual device, setting up for someone's special event (e.g., birthday, holiday), discussing past or upcoming purchases, planning a trip, anticipating a delivery, performing routine activities (e.g., brushing teeth, washing, etc.), commenting on a (previously viewed or while viewing) show or movie, describing the general activities of family or friends, and so on.

Such strategies, using conditional actions to time-shift interactions using a shared AIP, may be enacted by teachers and their students, employers and their employees, sports coaches and their players, government leaders and members of their organizations, bloggers and their followers, and so on. If responses are anticipated and generated for a sufficient number of conditions, a time-shifted and/or widely distributed set of responses may appear to be enacted in real time and personally connected.

A potential added benefit of setting up conditional actions in the form of audiovisual snippets (and other forms of exchange) and/or the clustering of information associates with time-shifted interactions is a reduction in overall bandwidth requirements compared, for example, to baud rates required for continuous video chat (even when video compression techniques are employed). As an example, during time-shifted game play, the total accumulated time of a series of conditional actions consisting of audiovisual snippets that are core to time-shifted play may be in the range of several minutes. Yet the actual time of game play by the recipient user may be in the range of hours. Compared with continuous online video exchange, the use (and even re-use) of audiovisual snippets may greatly reduce the total data transferred to perform the game or other time-shifted activities (e.g., instructional sequence, monitoring children's activities, etc.). Time-shifting audiovisual snippets and other forms of conditional actions and/or the insertion of AIP-initiated actions may also permit the transmission of information related to distance communications to be deferred to non-peak times for data transmission or, for example, while a user is asleep or engaged in separate activities not occupying significant telecommunications resources.

In further exemplary embodiments, a particularly useful application of a conditional response involves initiating a conditional action involving the shared AIP to be performed at a specified time (i.e., the condition is met when a specified time equates to real time). The specified time may involve a single data and time, an elapsed time (i.e., a difference in time relative to a reference time such as the current time), or be a so-called recurring time event, such as once every day, week, month, year, etc. This form of conditional response may be used to setup an event or action for a recipient user that may or may not further involve the initiating (e.g., distant) participant. Exemplary actions may involve setting up a telephone conversation or video conference at a specified time, a reminder for a child to go to bed, alerting (based on transit schedules) that departure must be imminent to catch public transit, and so on.

The shared AIP may also interface to so-called calendar applications, alarm clock applications, and/or other forms of notification or alerting software by transmitting the action (regarding, or at, the specified time) to one or more of these platforms. This allows a user to be alerted, not just buy a HIE (or HIA) associated with the shared AIP, but also by other devices (e.g., cell phones, alarm clocks, etc.) commonly used.

Utilizing a shared AIP, the process of time-shifting information exchange does not necessarily involve the formal generation of a message (e.g., in the form of text, audio, video, etc.). For example, while interacting generally (e.g., playing) with a shared AIP, a child may express a liking for a particular type of stuffed toy. Such interactions may not be directly coupled to the production of a message (formal or otherwise). Further, knowledge of the liking of the particular toy may not be directed toward any recipient (individually or collectively). However, at some later time, during one or more exchanges with a friend, parent or grandparent; the shared AIP may reveal that there was an expression of the liking of the particular stuffed toy by the child. Knowledge of this liking (again, without formal generation of any messaging) may result in ideas for gift purchase for the child.

In exemplary embodiments, FIG. 1A is an illustration of a scene 18a from a scenario in which the parents, grandparents and/or friends 10a, 14a, 15a of a young child (10b shown in FIG. 1B) setup, using a shared artificial intelligence personality via a cartoon-like HIE 11a on a display device, personalized conditional actions that are enacted whenever the child points toward, or looks at, particular objects. In this example, the personalized actions consist of audiovisual displays (e.g., 13, 14, 15) from each parent, grandparent or friend 10a, 14a, 15a whenever the child points or looks toward particular animals.

Using the shared AIP 11a (i.e., where exchanges are facilitated by a HIE, not shown, such as those described elsewhere herein), each parent or friend associates themselves with one or more images of animals 12a, 12b, 12c, 12d, 12e. In FIG. 1A, a grandfather 10a sets up a personalized audiovisual snippet 13 to be displayed whenever a penguin 12e is viewed or pointed at by the young child. The audiovisual snippet 13 may, for example, consist of additional images and/or videos of penguins 13b, text about penguins 13c, and/or sounds made by different penguins 13d, all while displaying images and/or audio and video of the grandfather 13a who is the source of the audiovisual snippet.

Relations and friends may each setup additional audiovisual snippets or other actions (e.g., haptic outputs, holographic displays, confirmation messages that the action has been performed, etc.) associated with any number of other animals 12a, 12b, 12c, 12d, 12e (including, for example, viewing real animals) or other related objects. In FIG. 1A, a grandmother 14a has setup (at a time convenient to her) up an audiovisual display 14 whenever a turtle is viewed, and a mother 15a has setup (at yet another time convenient to her) an audiovisual display 15 whenever a chicken is viewed.

Figure 1B:
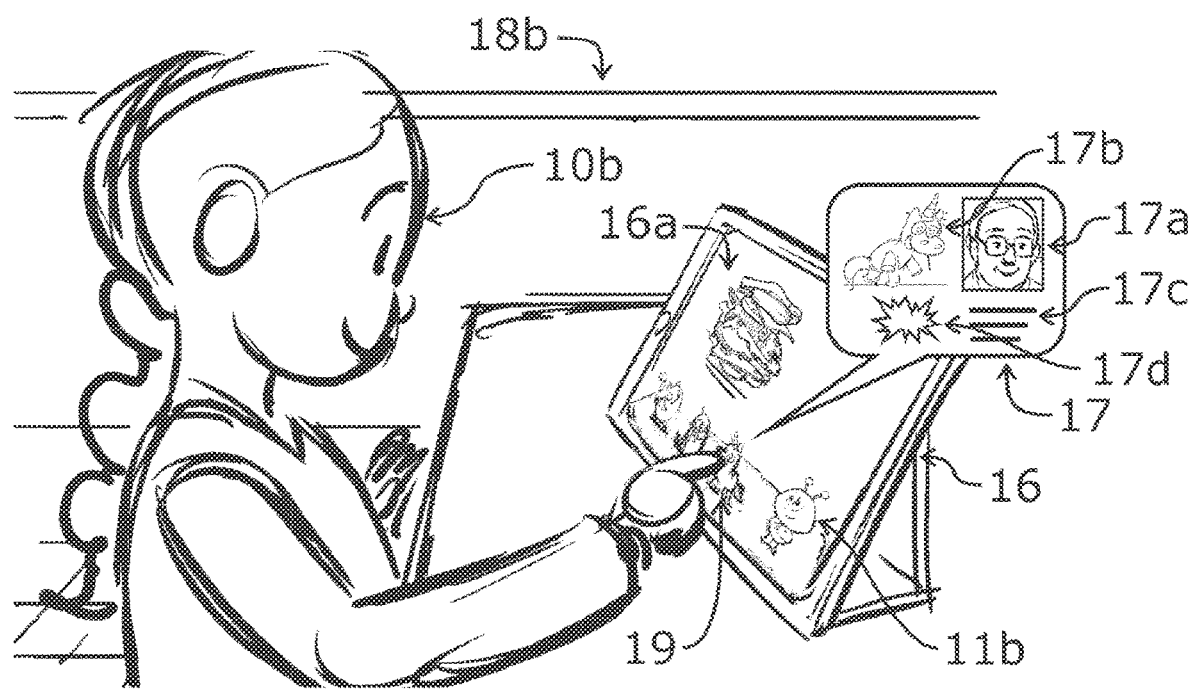
FIG. 1B is a follow-on scene from the scenario illustrated in FIG. 1A in which the previously established actions are performed upon meeting their associated conditions each time the child points toward an image of an animal.

FIG. 1B shows a follow-on scene 18b from the scenario illustrated in FIG. 1A in which previously established actions are performed by a shared AIP upon meeting their associated conditions. In this case, shared AIP exchanges are facilitated by a cartoon-like character displayed on the screen 16a of a tablet device 16, e.g., including hardware and/or software similar to other embodiments herein. Each time the child 10b views or points toward a particular animal on the tablet screen 16a, a personalized audiovisual snippet 17 may be displayed as generated by the relative or friend. At the time shown in FIG. 1B, the young child 10b is pointing toward a unicorn 19. The audiovisual snippet 17 setup by the grandfather (shown describing unicorns in the snippet 17a) includes images and/or videos 13b, text 13c, and/or sounds 13d, all about unicorns and related topics.

More generally, FIGS. 1A and 1B illustrate how conditional actions setup by any number of individuals at one or more times may be used to "time-shift" their interactions with other individuals. In some cases, it may not be apparent that actions are actually pre-established, making interactions appear "live", further increasing feelings of connectedness. The conditions for associated actions may be personalized and/or sophisticated (e.g., conditions within conditions) to further such feelings. For example, attempted viewing of animals as shown above may produce alternate, instructional snippets (directions to go to bed) from a parent if the time is past bedtime for the child.

Figure 2:
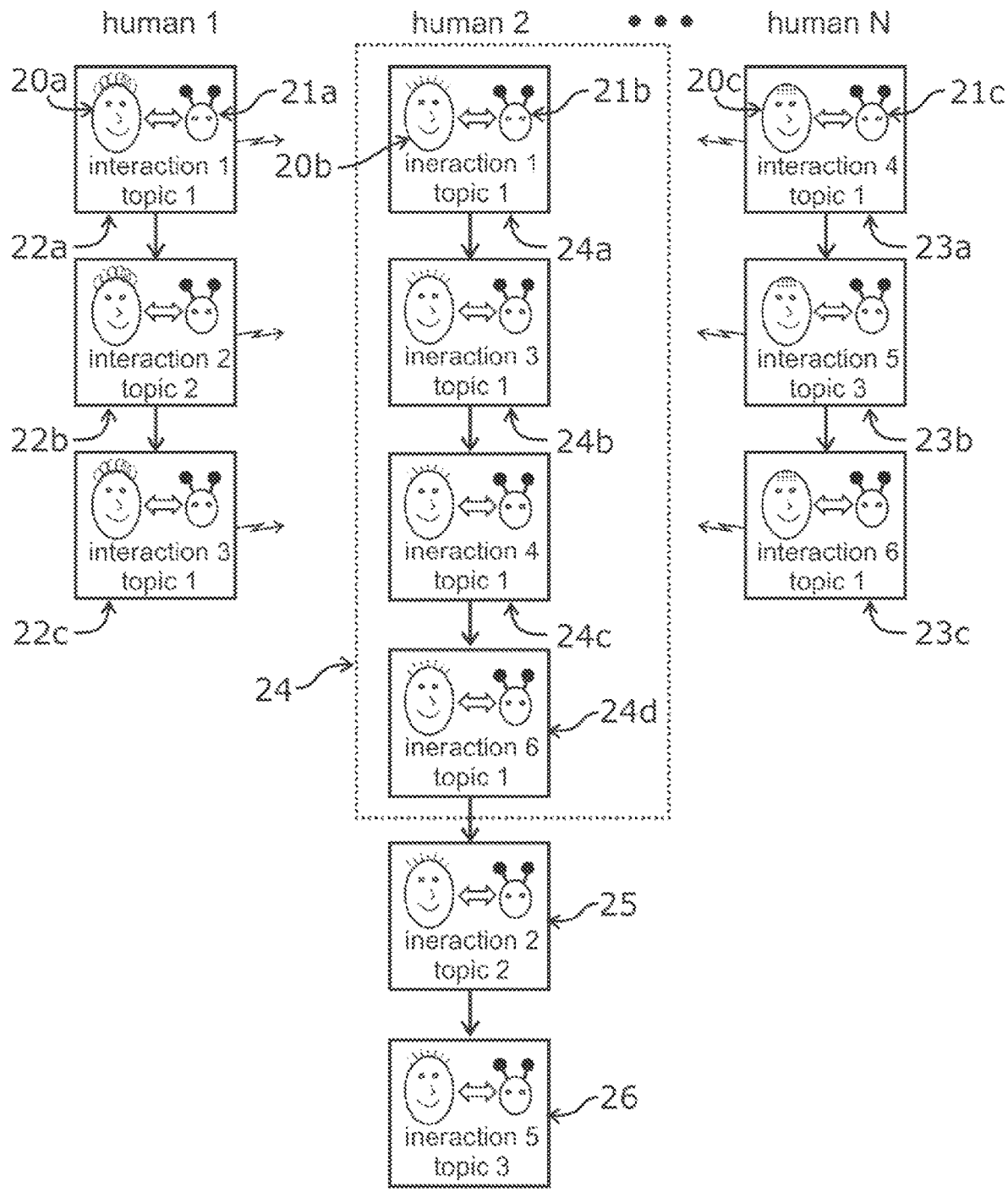
FIG. 2 is a flowchart showing, for efficient and effective review, an example of sorting and clustering interactions with multiple humans by a shared artificial intelligence personality according to topic areas.

In further embodiments, FIG. 2 illustrates steps whereby "time-shifted" exchanges among any number of users (e.g., 20a, 20c) may be sorted and clustered into topic areas during review by a recipient user 20b. In this exemplary case, a user 20a (labelled "human 1" in FIG. 2) may interact during ongoing activities that include a first topic 22a utilizing his/her HIE (and/or HIA) 21a instantiated with a shared AIP. A second interaction with the shared AIP by the same user 22b may involve a second topic. A third interaction by the same user 22c may revert back to the first topic. Along similar lines, another user 20c (labelled "human N" in FIG. 2) may interact with the shared AIP (i.e., a fourth interaction) 23a concerning the first topic. A fifth interaction 23b with the shared AIP by the same user 20c may involve a third topic. A sixth interaction 23c by the same user 20c may revert back to the first topic.

All six interactions 22a, 22b, 22c, 23a, 23b, 23c are transmitted to all HIEs (including 21a, 21b, 21c) associated with all users (including 20a, 20b, 20c) that are instantiated with the shared AIP. During time-shifted review by another user 20b (labelled "human 2" in FIG. 2), the AIP may present interactions 22a, 22b, 22c, 23a, 23b, 23c sorted according to topic. The four interactions 22a, 22c, 23a, 23c involving topic 1 are clustered (represented as encompassed with a dashed line 24) and presented first 24a, 24b, 24c, 24d. In this case, as a secondary sort, the four interactions 24a, 24b, 24c, 24d associated with the first topic are presented in the chronological sequence they occurred. As a result of the sorting and clustering, the recipient or reviewing user 20b (i.e., "human 2" in FIG. 2) does not need to search for additional interactions regarding the first topic (i.e., knowing that the AIP identifies and clusters all interactions on a topic). Once review of the first topic is complete, the reviewing user 20b may then progress to one or more interaction(s) involving a second topic 25 and subsequently to interaction(s) involving the third topic 26. Time and effort may be saved by sorting and clustering time-shifted exchanges based on topic and/or other criteria (e.g., information source, confidence score of the validity of interaction content, identity of others who viewed the content, number of others who viewed content and indicated a "like", etc.).

Figure 3:
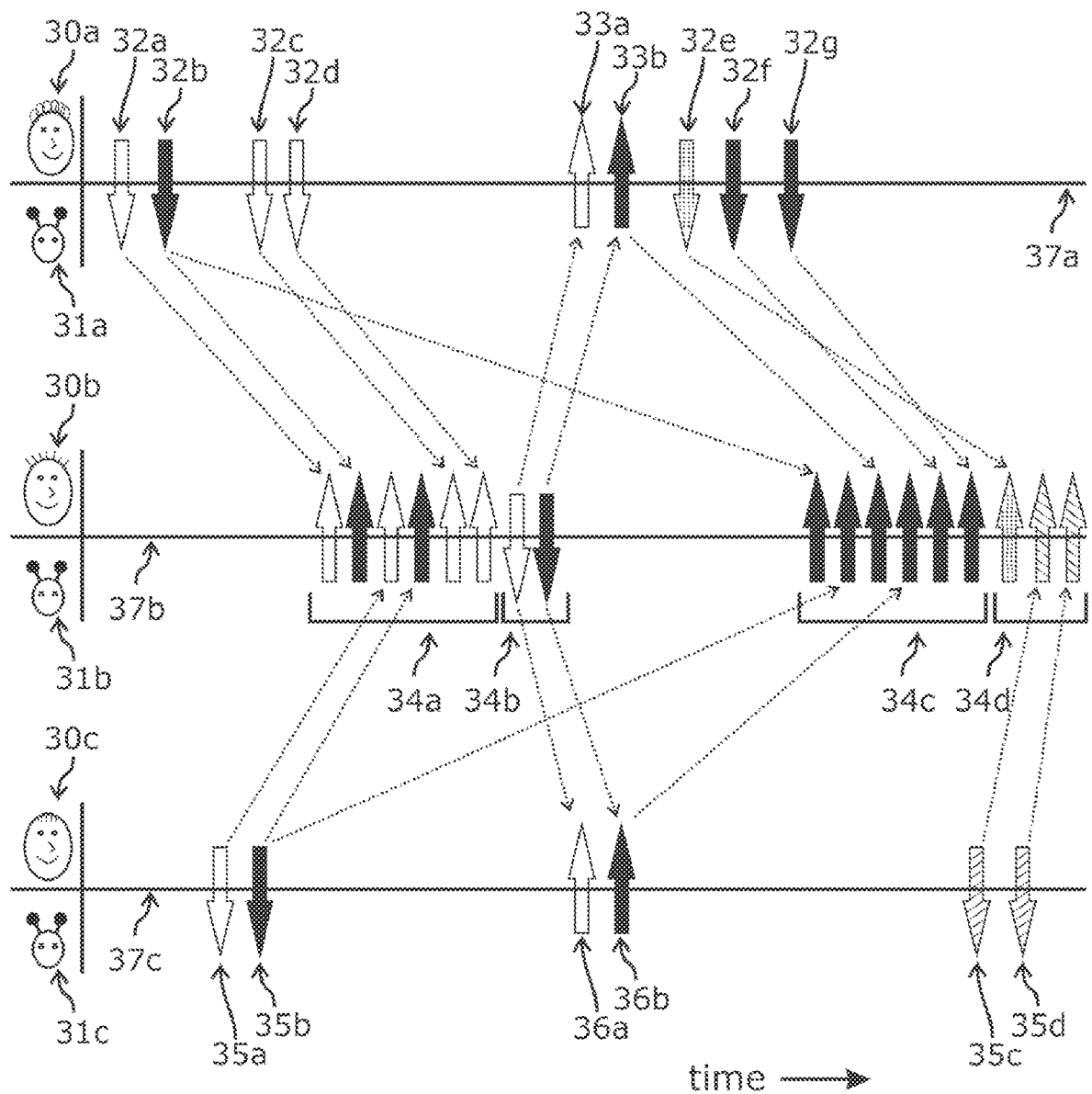
FIG. 3 illustrates a timeline of interactions involving a shared artificial intelligence personality in which interactions with two individuals are time-shifted, sorted and clustered for efficient review by a third individual who can then quickly formulate responses that may be sent to any or all members of the group.

In further exemplary embodiments, FIG. 3 shows simultaneous timelines 37a, 37b, 37c of shared AIP exchanges that demonstrate several additional benefits of time-shifted and/or curated AIP interactions. In this example, each individual 30a, 30b, 30c is able to interact at any time with corresponding HIEs and/or HIAs (31a, 31b, 31c respectively) instantiated with a shared AIP (i.e., installed with one or more processors such that the AIP interacts with the individual via one or more output devices and one or more sensors). In FIG. 3, arrows represent AIP-human interactions where the direction of the arrows represents the primary flow of key information (e.g., available for retrieval and presentation at some later time). Arrows filled with different patterns represent exchanges that involve different topics. Progression in time is shown from left-to-right for all three individuals 30a, 30b, 30c simultaneously.

In FIG. 3, the shared AIP is attuned particularly to optimize the time and effort spent by the individual 30b associated with interchanges represented within the middle timeline 37b. This individual 30b may, for example, be a busy parent or guardian interacting with two children 30a, 30c. Additionally, the parent 30b may be located distant from the children 30a, 30c, making real-time exchanges difficult. Interactions may result, for example, in one or more: text messages, emails, audiovisual clips, images, holograms, augmented or virtual reality displays, sound bites, songs, documents, electronic signatures, access codes, software controls and/or applications, spreadsheets, links to additional information, links to control physical devices (e.g., via the so-called internet-of-things), identified locations, contact information, calendar events, alerts, attached files, and other forms of information exchange that may be classified and curated by the shared AIP.

In the timelines 37a, 37b, 37c shown in FIG. 3, the first overall interactions 32a, 32b occur between the individual 30a shown in the upper timeline 37a and his/her HIE 31a, covering two topics (represented by a clear arrow 32a and a solid-fill arrow 32b). Two additional interactions 35a, 35b covering the same two topics (represented by a clear arrow 35a and a solid-fill arrow 35b) occur between the individual 30c shown in the lower timeline 37c and his/her HIE 31c. This is followed by two additional interactions 32c, 32d between the individual 30a shown in the upper timeline 37a and his/her HIE 31a, covering the topic represented by clear arrows.

Next, the individual 30b represented within the middle timeline 37b uses his/her shared AIP 31b to rapidly review 34a all available interactions 32a, 32b, 35a, 35b, 32c 32d, in this example, in the order in which they were generated (i.e., regardless of topic or who they came from). The interactions 32a, 32b, 35a, 35b, 32c 32d covered two topics represented by clear arrow 32a, 35a, 32c 32d and solid-fill arrows 32b, 35b. The individual 30b represented within the middle timeline 37b responds 34b to each topic separately using his/her HIE 31b instantiated with the shared AIP. Responses 33a, 33b, 36a, 36b to both exchange participants 30a, 30c are simultaneously made available via the shared AIP. Responses cover both topics raised including the topics represented by clear arrows (33a directed at recipient 30a, and 36a directed at recipient 30c) and by solid-fill arrows (33b directed at recipient 30a, and 36b directed at recipient 30c). Either or both responses 34b may be aided in their generation, in whole or in part, by the shared AIP.

In the timelines of shared AIP exchanges depicted in FIG. 3, the individual 30c represented in the lower timeline 37c is the first to review the two responses to the topics represented by clear arrows 36a and by filled arrows 36b. A bit later in time, the individual 30a represented in the upper timeline 37a reviews the same two responses (i.e., topics represented by clear arrows 33a and by filled arrows 33b). This same individual 30a then generates an exchange with his/her HIA 31a instantiated with the shared AIP involving a new topic represented by a dot-filled arrow 32e before generating two additional interactions regarding the topic represented by solid-filled arrows 32f, 32g. Some time later, the individual 30c represented in the lower timeline 37c generates two more interactions 35c, 35d covering yet another topic area, represented by line-filled arrows.

Returning to the efficient and timely review of shared AIP interactions by the individual 30b represented within the middle timeline 37b, he/she quickly considers all interactions associated with the topic represented by solid-fill arrows 34c (secondarily sorted according to the time the interactions were generated or reviewed). This includes interactions about the topic that were previously reviewed 32b, 35b, responses that had been sent out 36b, 33b to recipients 30a, 30c, and newly generated interactions 33f, 32g since previously considering the topic area (within 34a). Quickly considering all interchanges on the topic area 34c and knowing that no other exchanges on the topic area are available, the shared AIP user 30b may form fully informed decisions or conclusions about the topic area. The individual 30b represented within the middle timeline 37b then quickly moves on to consider, this time in chronological order, interchanges classified within additional topic areas 34d represented by dot-filled arrows 32e and line-filled arrows 35c, 35d.

Summarizing the benefits of time-shifted interactions using a shared AIP illustrated within FIG. 3, an individual may receive and review time-shifted exchanges: within a condensed time scale, that have been sorted for review in any order including chronologically or by sender or topic, that result in responses that may be sent to multiple recipients simultaneously, that include all on-topic exchanges when considering a given topic (including those that may have been previously reviewed and reactions to previous considerations), that may be aided (in whole or in part) by responses generated by the shared AIP, and to ensure that all available interactions by a set of individuals are reviewed and, if desired, responded to.

Figure 4:
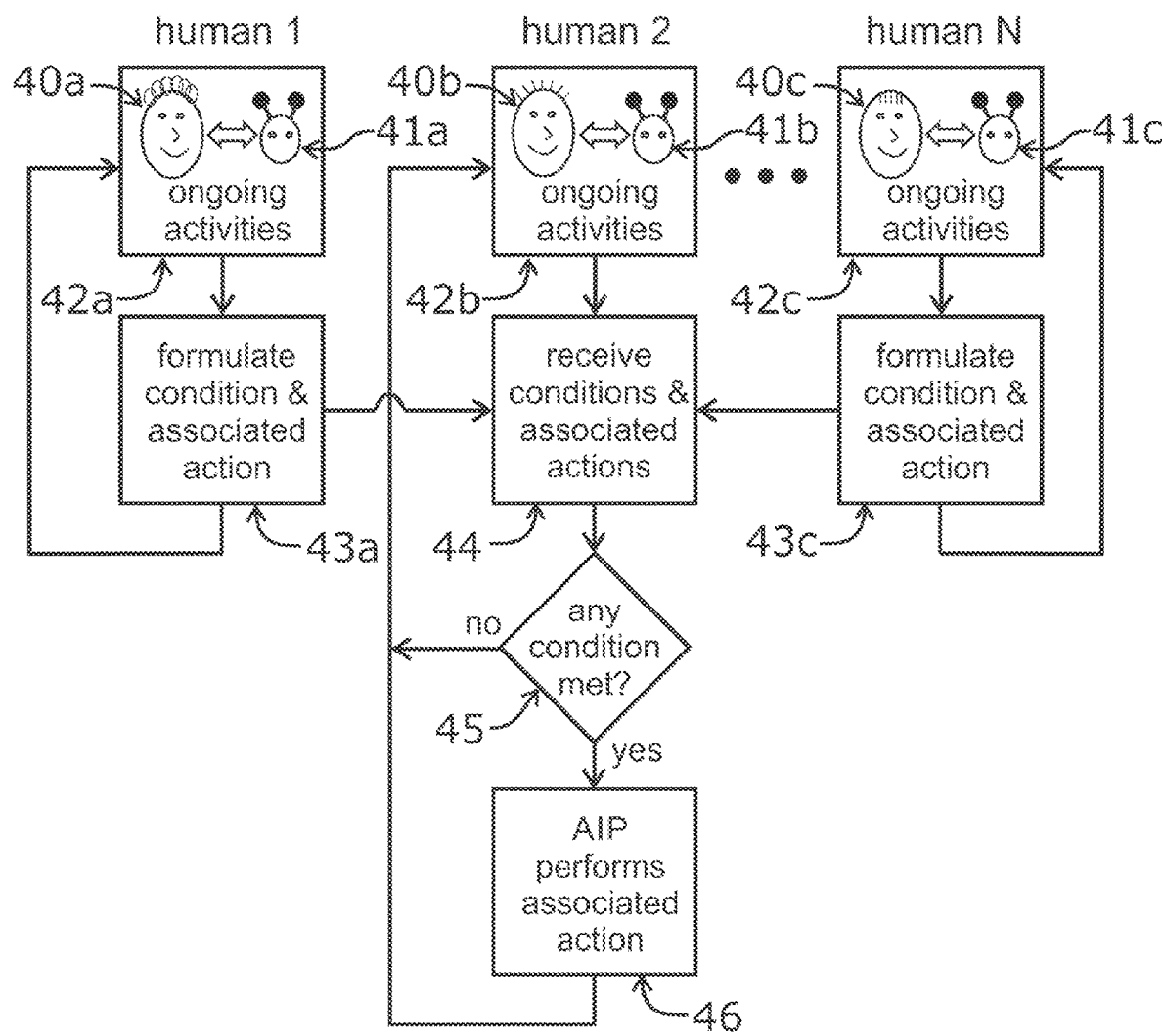
FIG. 4 is a flowchart showing the accumulation of conditional actions from one or more individuals and processes to determine when those conditional actions are executed by a shared artificial intelligence personality.

In additional exemplary embodiments, FIG. 4 is a flowchart of steps for one or more shared AIP users 40a, 40c (i.e., initiating users) to formulate one or more conditional responses and associated actions to be performed by another shared AIP user 40b (i.e., a target user). In this example, one user 40a (labelled "human 1" in FIG. 4) interacts during ongoing activities 42a utilizing his/her HIE (and/or HIA) 41a instantiated with a shared AIP. During such interactions, this user 40a (i.e., an initiating user) may formulate a conditional response comprising a condition and an associated action 43a to be performed by the target user 40b (labelled "human 2" in FIG. 1).

In FIG. 4, the target user 40b may be performing ongoing activities 42b utilizing his/her HIE (and/or HIA) 41b. The shared AIP associated with the target user 40b is positioned to receive any conditions and associated actions 44 from all initiating users (e.g., 40a, 40c). Periodically, the shared AIP associated with the target user 40b checks to determine if any of the conditions (or any combinations of conditions) are met 45. If so, the action(s) associated with the condition(s) are performed 46 before returning to ongoing activities 42b.

More generally, as illustrated in FIG. 4, any initiating user 40c (labelled "human N" in FIG. 4) may interact during ongoing activities 42c with the shared AIP instantiated within his/her HIE (and/or HIA) 41c. During such activities, the user may formulate a conditional response comprising a condition and an associated action 42c to be performed by the target user (labelled "human 2" in FIG. 1). The condition(s) and associated actions(s) are incorporated within the shared AIP associated with the target user 13 who may then benefit from the collective of conditional actions 15 initiated from any number of users.

Figure 5:
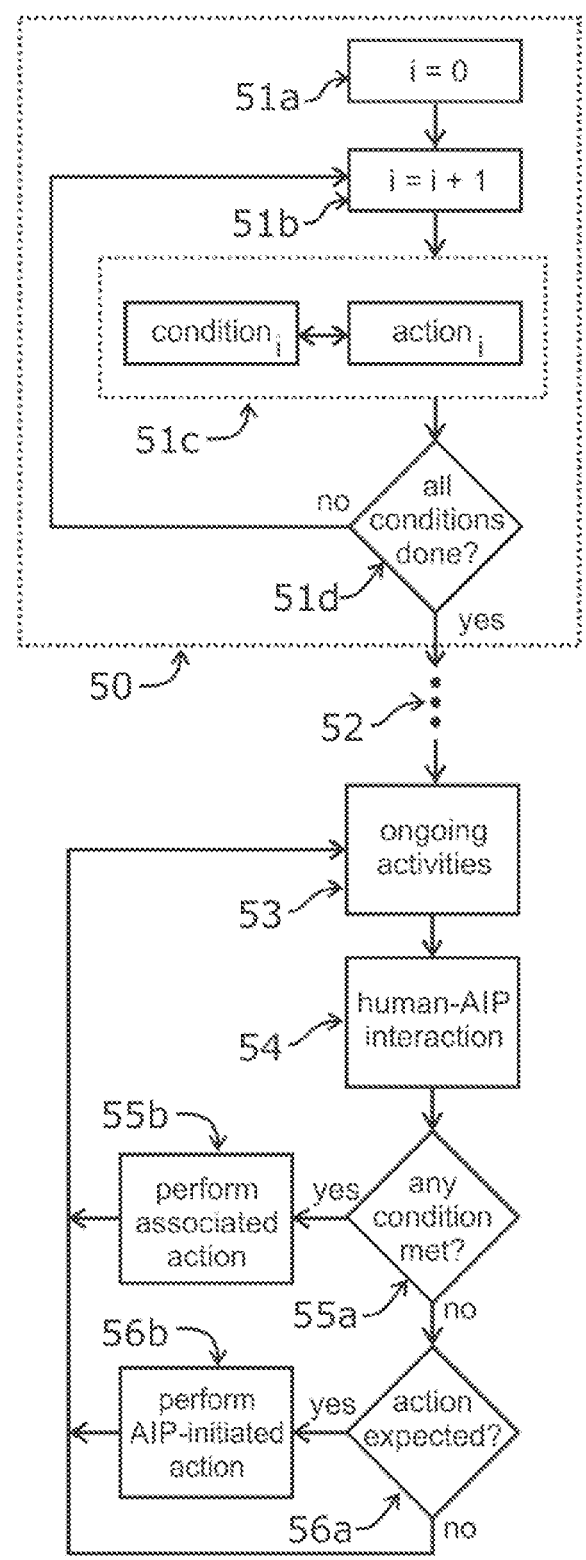
FIG. 5 is a flowchart showing the accumulation of conditional actions and insertion of one or more alternative actions by an artificial intelligence personality when no conditions are met and a response is expected.

In further embodiments, FIG. 5 expands upon concepts presented in FIG. 4 by adding the notion that, absent any conditions 55a of conditional actions 55b being met, a shared AIP may be expected to provide a response during an interchange with a user. Shared AIP actions 55b may be generated as a result of meeting the conditions 55a of a conditional action 55b that may have been established by any other shared AIP user, or pre-established by the interacting user. However, if a situation arises in which a response is expected during an AIP interchange, then the AIP may, based on its cumulatively acquired personality and knowledge base, initiate an action 56b.

In FIG. 5, the upper portion 50 of the flowchart is a simple loop structure showing the establishment of one or more conditions and their associated actions 51c. An index ("i") is initialized 51a and incremented 51b as a portion of the loop structure. During each iteration, a condition ("$condition_i$") and associated action ("$action_i$") are registered 51c within the memory of the shared AIP. Once all conditions are registered 51d, this contingent of "time-shifted" actions may occur (including more than once) at any later time, where the shift in timeline is represented by a vertical ellipsis 52 in FIG. 5.

At some later time, during ongoing activities 53, a user may interact with the shared AIP 54 when, during such interactions 54, software within the AIP may determine (e.g., using a loop structure 50 similar to the upper portion in FIG. 5) if any pre-defined condition has been met 55a during the interaction. If so, then the associated action is performed 55b. Otherwise, the AIP assesses whether any sort of response or action might be expected 56a. If so, the AIP initiates and perform an action 56b based on its cumulatively acquired personality and knowledge base.

In additional embodiments, a shared AIP-initiated action may be an element of a conditional action (i.e., setup by a human). In FIG. 5, the additional AIP element may be an essential component or an adjunct to the performing of the associated action in step 55b. For example, a conditional action by a distant user might include reporting on the most recently available (e.g., after time-shift) weather forecast at a particular location. The conditional action may be established such that the weather forecast is inserted by the shared AIP as an element (i.e., dependent on both time and geographic location) of the overall conditional action.

Conditional actions may be further modified by the AIP based on a wide range of additional factors including, for example, milestones of a user (e.g., receipt of an award, birthday), time of day, the presence of other individuals in the environment of the user (e.g., when the privacy of information may be taken into consideration), personal preferences of the user, and so on. As a further example, following on with the weather forecast AIP action just described, temperatures may be converted by the AIP from Celsius to Fahrenheit based on personal preferences of the target user (i.e., known by the shared AIP).

Any action that is either initiated or modified by the shared AIP may be reviewed by one or more (human) shared AIP users. Reactions by the one or more users may include approval, disapproval, happiness, sadness, surprise, disbelief, fear, anger, excitement, anticipation, and/or vigilance. In some cases, when there is disapproval of an AIP initiated or modified action, steps may be taken to reverse the consequences of the disapproved action. For example, when playing a game, a move during the game may be "taken back" by re-establishing the game to a status just prior to the move. Along similar lines, if a shared AIP provided any piece of information that was later determined to be not true or misleading, then the AIP may be "corrected" by distributing (if desired, using the shared AIP itself) statements to rectify the false or misleading action(s).

In further embodiments, one variation of setting up conditional actions is the setting up of such AIP actions by a user directed at him or herself. For example, conditions involving the time of day may be used to setup reminders, calendar, and/or alarm clock notifications. Reminders or other actions directed back to a user may be initiated by the AIP based on wide range of pre-established conditions such as arriving at a specified geographic location, being in the presence of another person or a pet, being in the vicinity of a particular device, receiving a particular (i.e., specifically defined) interaction or any form of prompting from a distant user, the occurrence of a world event, a particular health condition (e.g., resting heart rate above 100 beats/minute), performing a specified activity, receiving a message concerning a particular topic, and so on.

Conditional actions may include revealing (by the shared AIP to the target user via a HIE) the source of the condition and associated action. Alternatively, conditional actions setup by one or more users as well as AIP-initiated actions during a shared AIP-user interaction, may be designed to help to establish ("covert") scenarios in which it is not evident to a target user that some portions, or even all or most, of a time-shifted exchange involving a distant user is actually being initiated by the shared AIP.

Controlling knowledge of the source(s) of conditional actions may greatly enhance a sense of human connectedness. For example, when playing a game, many (or even all)

of the moves in the game may arise from the expert knowledge (including actions derived using deep learning and other AI approaches) within the shared AIP. Commentary, encouragement and/or reactions to different playing situations (e.g., via audiovisual clips, messaging, etc.) may be the only actual (time-shifted) interchange with a distant user. The degree of difficulty and/or sophistication in AIP-initiated gaming actions may be predetermined, for example, by a distant user, parent, guardian, mentor, technician, or the shared AIP user him/herself. The AIP level of expertise may be adjusted to match that of the distant participant or the shared AIP user, a target play level to encourage learning, a level designed to allow a particular participant to win, a level that consumes up to a threshold in computational resources, a level that occupies up to a threshold in computational time, and so on.

Similar shared AIP scenarios in which the distinction between conditional actions established by a distant user and those originating from the AIP may be blurred or non-evident include those between teachers and students, repair technicians and their customers, lawyers and their clients, children and their extended family members, and so on. While teaching, AIP responses may be at a grade level of a student user. When playing a game involving answers to trivia, questions may be made age-appropriate. Discussions of world events or social media topics may be a blurred mix of shared AIP updates and remote human commentary.

An AIP level of sophistication may also be based on a fee-for-use structure where, for example, simple responses and/or those confined to a specific topic are provided at a reduced (or no) cost. The AIP level of sophistication (and, for example, computational resources required) may be elevated for the fee.

Figure 6A:
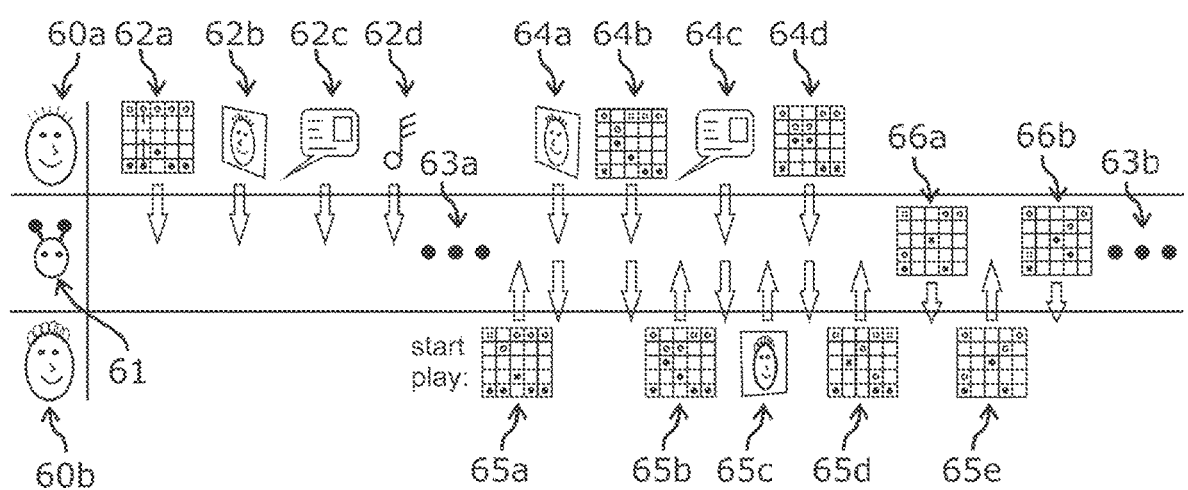
FIG. 6A is a timeline showing the beginning of a time-shifted game of simplified checkers facilitated by an artificial intelligence personality.
Figure 6B:
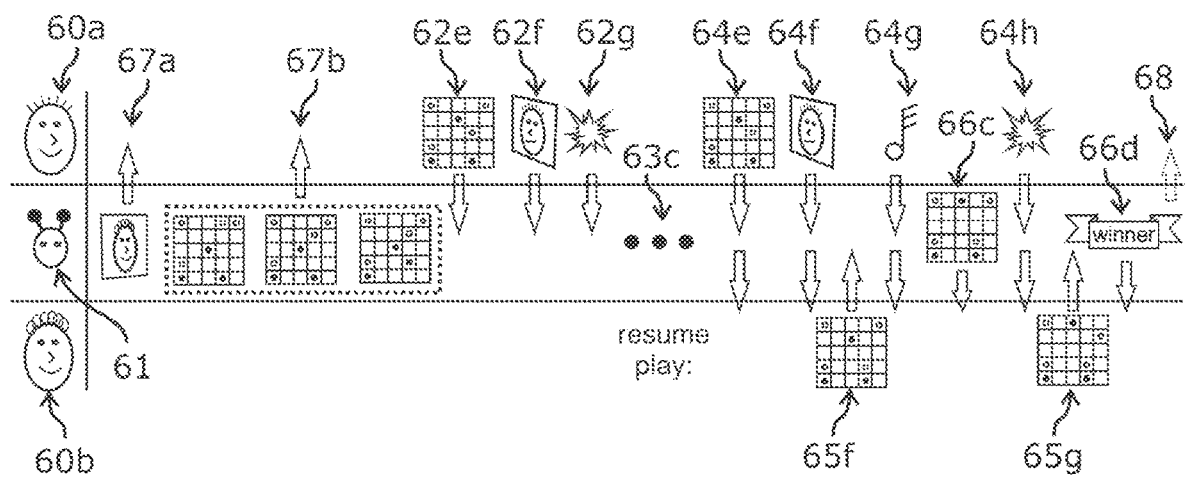
FIG. 6B is a timeline, continuing from FIG. 6A, showing the conclusion of a time-shifted game of simplified checkers facilitated by an artificial intelligence personality.

In another embodiment that illustrates several advantages of time-shifting activity using a shared AIP, FIGS. 6A and 6B show a time sequence in which a distant friend (e.g., parent, guardian, grandparent, confined person, hospitalized individual, astronaut, etc.) 60a plays a "time-shifted" board game with a child 60b. In this example, the board game is a simplified version of the game "checkers" where, in both FIGS. 6A and 6B, activities that initiate from the remote friend 60a are represented across top rows, from the shared AIP 61 across middle rows, and from the child 60b across bottom rows. Sequential steps (i.e., the progression of time) are represented from left-to-right in FIGS. 6A and 6B. In this game, the child is playing white tokens and the distant friend is playing dark tokens where, according to the traditional rules of checkers, the player with dark pieces moves first.

The distant friend 60a organizes his/her participation in the time-shifted game by setting up, with the shared AIP (via one or more HIEs and/or HIAs 61), one or more responses to anticipated board situations 62a, audiovisual clips to be played under various conditions 62b, messages that may, for example, include embedded images to be displayed upon encountering pre-defined conditions 62c, and music clips that may include songs to be sung, for example, when it is anticipated that the end of the game is near 62d. Interactions 62a, 62b, 62c, 62d between the distant friend 60a and the shared AIP 61 are shown symbolically in FIG. 6A using arrows, representing the passing of information from the distant friend 60a to the shared AIP 61. Interactions between the friend 60a and the AIP 61, absent direct communication with the child, may occur over one or more times periods (of any duration) that are convenient to the remote friend 60a.

At some later time (continuing the temporal sequence from left-to-right where the time-shift is represented by an ellipsis 63a), absent any direct communication with the distant friend, the child 60b begins time-shifted game play by conveying a response 65a to the AIP 61 to the initial (dark token) move already setup by the friend 60a. Child 60b interactions 65a, 65b, 65c, 65d, 65e, 65f, 65g with the shared AIP 66 are symbolically illustrated by arrows in FIGS. 6A and 6B where arrow direction represents the overall flow of information between the child 60c and the AIP 61.

A welcoming audiovisual clip 64a, (i.e., a conditional action) from the distant (and now absent direct communication) friend, is displayed by the shared AIP 61 to the child 60b. Such conditional actions 64a, 64b, 64c, 64d, 64e, 64f, 64g, 64h that may be enacted by the shared AIP 61 are shown symbolically in FIGS. 6A and 6B using double arrows, indicating the prior transfer of information from the friend 60a to the shared AIP 61 and, at some later time when a condition associated with the action is met, from the shared AIP 61 to the child 60b (i.e., during the "time-shifted" game play).

The initial move by the child 60b was anticipated by the (again, absent from direct communication) distant friend 60a. Thus, this move 64b (in the form of a conditional action) is conveyed via the AIP 66 to the child 60b. The child 60b then responds with his/her move 65b and the friend conveys a pre-established message including an imbedded image 64c that is responded to by the child 60b with an audiovisual snippet 65c. Another move 64d, resulting from the game board situation that was anticipated by the distant friend 60a, is subsequently conveyed to the child 60b.

The next game move 65d by the child 60b was not anticipated by any conditional setup. This forces the shared AIP 61 to interject a response move 66a. A pre-determined skill level (e.g., appropriate for the child 60b), target skill level for the child, matching the skill level of the distant friend, processing time, and/or availability of computing resources may individually or collectively play a role in determining the competitiveness of such game moves 66a, 66b by the shared AIP 61. The child 60b may not be aware that the source of the move 66a was the shared AIP 61 (versus the distant friend 60a). The next move 65e by the child 60b also results in a game situation in which no pre-established conditions for actions are met, forcing the shared AIP 61 to be the source of another gaming move 66b. At this time, the child takes an extended break from game play, indicated by another ellipsis 63b.

The break allows sufficient time for updated game play to be conveyed to the distant friend (via the shared AIP 61) as illustrated in the follow-on timeline in FIG. 6B. At a convenient time, the distant friend 60a re-engages with the shared AIP 61 (i.e., absent any direct communication with the child 60b). The distant friend is updated with the audiovisual snippet 67a, previously created 65c by the child 60b and transferred via the shared AIP 61. The shared AIP 61 also updates the distant friend on the status of game play by selecting and/or sorting key (i.e., including most recent) game moves. The cluster of moves is displayed collectively (indicated as enclosed by a dashed rectangle) 67b by the shared AIP 61 for efficient (i.e., summarizing and time-saving) review by the distant friend 60a.

Continuing the right-to-left progressive timeline in FIG. 6B, the distant friend 60a decides to override an AIP-sourced game move by re-setting the game board 62e and recording an audiovisual clip, explaining the override 62f Seeing the state of the game, the friend also sets up a conditional star-burst display 62g using the shared AIP in anticipation of losing the game. The distant friend then moves on to other activities, dis-engaging from interactions with the shared AIP, at least on topics related to game play with the child 60b. The break in time 63c allows for shared AIP interactions to be updated within all HIEs and/or HIAs, including the specifics of the time-shifted game play.

At some later time 63c, absent direct communication with the distant friend 60a, the child 60b resumes play by viewing the game move that was overridden 64e by the distant friend 60a and the accompanying audiovisual clip 64f that was previously generated 62f by the friend 60a. The child 60b responds with his/her new move 65f whereupon, seeing the end of the game as near, the musical snippet 64g previously recorded 62d by the friend 60a along with one last move by the AIP 66c (on behalf of the distant friend) is conveyed to the child 60b. The more recently recorded (by the friend) starburst display is shown 64h to the child 60b while he/she makes a final move 65g. Recognizing that the child has won (i.e., black playing pieces are no longer able to move forward), the AIP 61 congratulates 66d the child 60b and conveys results to the friend 60a (to be received at a later date, represented by a dashed arrow 68).

FIGS. 6A and 6B exemplify some key features of time-shifted interactions facilitated by a shared AIP. At no time during the game were the child and distant friend in direct communication with each other. Both were free to interact in time-shifted game play whenever and wherever (and using whatever devices) they wished. The AIP facilitated time-shifted exchange by: 1) performing actions upon encountering pre-arranged conditions, 2) sorting and clustering responses for efficient review, 3) stepping in to perform independent actions when needed, and 4) allowing (hopefully rarely) its actions to be overridden upon subsequent human review.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

instantiating an artificial intelligence personality into the first human interaction entity, comprising installing the artificial intelligence personality with the first processor such that the artificial intelligence personality interacts with the first human via the one or more first interaction output devices;

providing, in proximity to a second human, a second human interaction entity comprising a second electronic device that includes a second processor, one or more second interaction output devices operatively coupled to the second processor, and one or more second sensors operatively coupled to the second processor;

instantiating the artificial intelligence personality into the second human interaction entity, comprising installing the artificial intelligence personality with the second processor such that the artificial intelligence personality interacts with the second human via the one or more second interaction output devices;

acquiring, during an interaction between the first human interaction entity and the first human, first interaction data from the one or more first sensors;

identifying, by the first processor, from the first interaction data, an action to be performed by the second human interaction entity upon sensing a condition for performing the action;

transmitting, from the first processor to the second processor, indicators of the action and the condition;

after receiving the indicators, acquiring, during an interaction between the second human interaction entity and the second human, second interaction data from the one or more second sensors; and identifying, by the second processor, from the second interaction data, the condition for performing the action.

2. The method of claim 1, wherein the action is performed with the one or more second interaction output devices.

3. The method of claim 2, wherein an acknowledgement that the action was performed is transmitted from the second processor to the first processor.

4. The method of claim 1, wherein the action comprises one or more of playing an audio clip, playing a video clip, playing an audiovisual clip, displaying one or more images, making a move within a game, showing a text message, showing the contents of an email, displaying a hologram, displaying an image on an augmented reality display, showing an image on a virtual reality display, playing a song, displaying a document, showing a spreadsheet, generating an electronic signature, providing an access code, loading a software application, providing a link to additional information, controlling a physical devices, identifying a location, providing contact information, producing a calendar event, generating an alert, providing an attached file, and transmitting from the second processor to the first processor an acknowledgement that the condition was identified.

5. The method of claim 1, wherein additional actions to be performed upon sensing additional conditions for performing the additional actions are determined during additional interactions between the first human interaction entity and the first human; and indicators of the additional actions and additional conditions are transmitted to the second processor.

6. The method of claim 1, wherein additional human actions to be performed upon sensing additional human conditions for performing the additional actions are determined during human interactions between an additional interaction entity and an additional human; and indicators of the additional human actions and additional human conditions are transmitted to the second processor.

7. The method of claim 1, wherein the condition for performing the action comprises identifying one or more of a specific time, a recurring time, an elapsed time, the second human performing an activity, the second human arriving at a geographic location, the second human being at a location, the second human observing a location, the second human pointing toward a location, a state within a game, the second human generating a verbal statement, the second human generating a gesture, the second human generating a facial expression, the second human being in the presence of another person, the second human being in the presence of a pet, the second human being in the vicinity of a device, the second human receiving information from a third human, the occurrence of a world event, a health condition of the second human, the second human receiving a message concerning a particular topic, the second human generating text, and a contact established by the second human with a third human.

8. The method of claim 7, wherein the one or more of specific time to perform the action, recurring time to perform the action, and elapsed time to perform the action are transmitted to one or more of a calendar application, an alarm clock application and a user-notification application.

9. The method of claim 1, wherein the action is performed based on identifying the condition from one or more of additional first interaction data from the first human, additional second interaction data from the second human and additional interaction data from additional humans.

10. The method of claim 1, wherein the condition for performing the action is not known by the second human.

11. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

instantiating an artificial intelligence personality into the first human interaction entity, comprising installing the artificial intelligence personality with the first processor such that the artificial intelligence personality interacts with the first human via the one or more first interaction output devices;

providing, in proximity to a second human, a second human interaction entity comprising a second electronic device that includes a second processor, one or more second interaction output devices operatively coupled to the second processor, and one or more second sensors operatively coupled to the second processor;

instantiating the artificial intelligence personality into the second human interaction entity, comprising installing the artificial intelligence personality with the second processor such that the artificial intelligence personality interacts with the second human via the one or more second interaction output devices;

classifying, during one or more interactions between the first human interaction entity and the first human, a first interaction topic;

transmitting, from the first processor to the second processor, the one or more interactions classified as being associated with the first interaction topic; and presenting collectively, with the one or more second interaction output devices, the one or more interactions classified as being associated with the first interaction topic.

12. The method of claim 11, wherein the one or more interactions classified as being associated with the first interaction topic are further sorted according to one or more of times the interactions were generated, interaction content sorted alphabetically, interaction content sorted numerically, and a pre-defined set of interaction content priorities.

13. The method of claim 11, wherein an additional interaction topic is classified, during the one or more interactions between the first human interaction entity and the first human; and one or more additional topic interactions classified as being associated with the additional interaction topic are transmitted to the second processor.

14. The method of claim 11, wherein an additional human interaction topic is classified, during one or more additional human interactions between an additional human interaction entity and an additional human; and one or more additional human interactions classified as being associated with the additional human interaction topic are transmitted to the second processor.

15. The method of claim 14, wherein the interactions and additional human interactions are sorted according to the first interaction topic and additional human interaction topic sorted alphabetically, the first interaction topic and additional human interaction topic sorted numerically, occurrence times of the one or more interactions and additional human interactions, identities of the first human and the additional human sorted alphabetically, interaction content sorted alphabetically, interaction content sorted numerically, and a pre-defined set of interaction content priorities.

16. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

instantiating an artificial intelligence personality into the first human interaction entity, comprising installing the artificial intelligence personality with the first processor such that the artificial intelligence personality interacts with the first human via the one or more first interaction output devices;

providing, in proximity to a second human, a second human interaction entity comprising a second electronic device that includes a second processor, one or more second interaction output devices operatively coupled to the second processor, and one or more second sensors operatively coupled to the second processor;

instantiating the artificial intelligence personality into the second human interaction entity, comprising installing the artificial intelligence personality with the second processor such that the artificial intelligence personality interacts with the second human via the one or more second interaction output devices;

initiating, by the second human interaction entity using the one or more second interaction output devices, a first interaction directed at the second human;

transmitting, using the second electronic device, first interaction indicators to the first processor;

presenting, using the one or more first interaction output devices, the first interaction indicators to the first human;

sensing, using the one or more first sensors, a reaction by the first human; and transmitting, using the first electronic device, reaction indicators to the second processor.

17. The method of claim 16, wherein the reaction by the first human is one or more of approval of the first interaction, disapproval of the first interaction, happiness, sadness, surprise, disbelief, fear, anger, excitement, anticipation, and vigilance.

18. The method of claim 16, wherein the reaction by the first human causes an additional interaction initiated by the second artificial intelligence personality directed at the second human.

19. The method of claim 18, wherein the additional interaction results in one or more steps to overturn the first interaction.

20. The method of claim 16, wherein initiating the first interaction depends on one or more of an age of the second human, a skill level of the second human, a target skill level of the second human, a skill level of the first human, a pre-determined skill level, a location of the second human, a preference of the second human, a time of the first interaction, a presence of other humans in the environment of the second human, available computational resources, and available computational processing time.

* * * * *